BED AND PLATEN HECTOGRAPHIC ADDRESS MACHINE

Original Filed Oct. 11, 1948 4 Sheets-Sheet 1

INVENTOR.
ANSEL J. WRIGHT
BY Paul, Paul & Moore
ATTORNEYS

BED AND PLATEN HECTOGRAPHIC ADDRESS MACHINE

Original Filed Oct. 11, 1948 4 Sheets-Sheet 2

INVENTOR.
ANSEL J. WRIGHT
BY Paul, Paul & Moore
ATTORNEYS

BED AND PLATEN HECTOGRAPHIC ADDRESS MACHINE

Original Filed Oct. 11, 1948 4 Sheets-Sheet 3

INVENTOR.
ANSEL J. WRIGHT
BY Paul, Paul & Moore
ATTORNEYS

Oct. 3, 1950 A. J. WRIGHT Re. 23,279
BED AND PLATEN HECTOGRAPHIC ADDRESS MACHINE
Original Filed Oct. 11, 1948 4 Sheets-Sheet 4
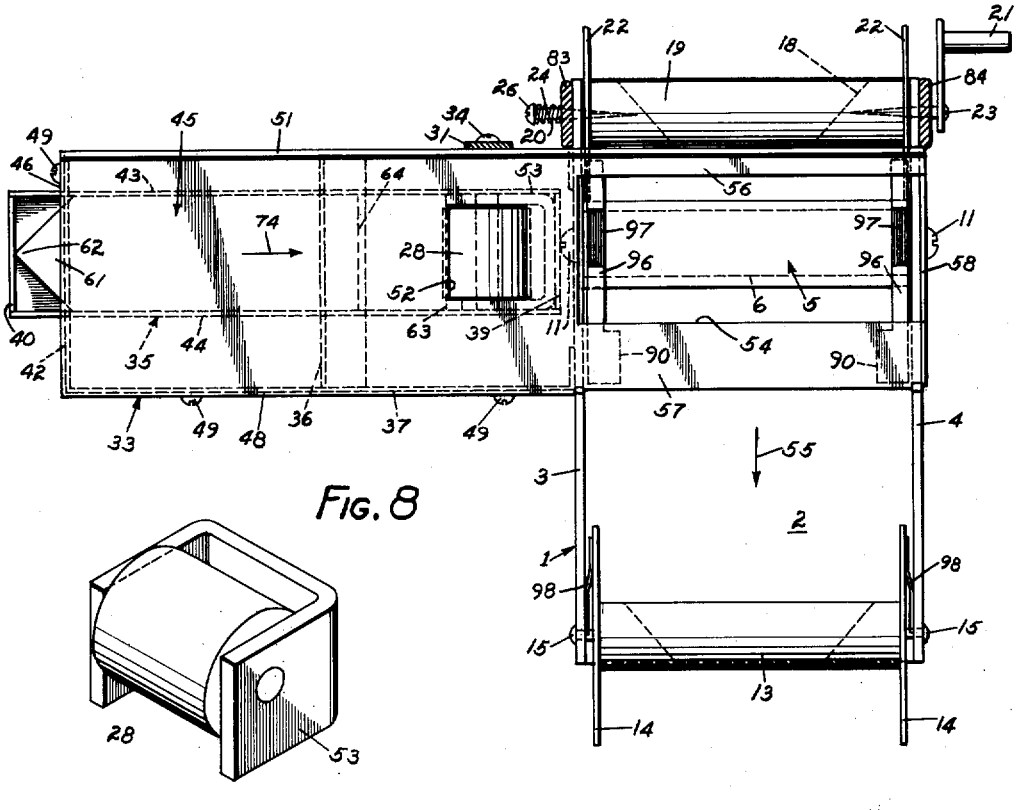
FIG. 8
FIG. 11
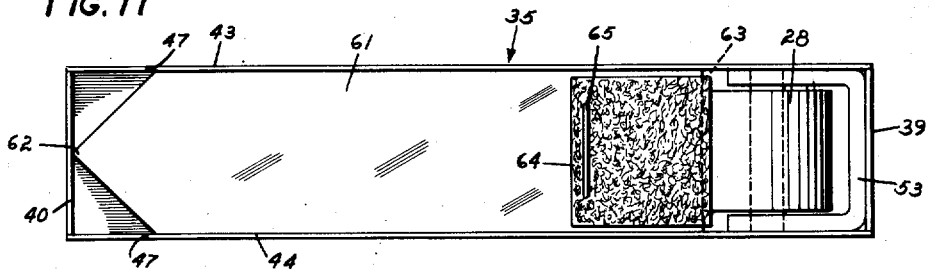
FIG. 10
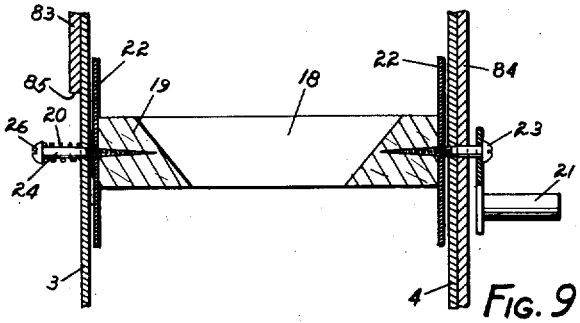
FIG. 9
INVENTOR.
ANSEL J. WRIGHT
BY
Paul, Paul & Moore
ATTORNEYS Reissued Oct. 3, 1950 Re. 23,279

UNITED STATES PATENT OFFICE 23,279

BED AND PLATEN HECTOGRAPHIC ADDRESS MACHINE

Ansel J. Wright, Minneapolis, Minn.

Original No. 2,503,185, dated April 4, 1950, Serial No. 53,815, October 11, 1948. Application for reissue May 19, 1950, Serial No. 163,107

4 Claims. (Cl. 101—57)

Matter enclosed in heavy brackets [ ] appears in the original patent but forms no part of this reissue specification; matter printed in italics indicates the additions made by reissue

An object of the present invention is to provide a machine for expediting the operation of addressing envelopes, [and] *which* has been found extremely useful in numerous lines of [businesses] *business* where large numbers of letters, bills and advertising matter are sent out periodically to the same addresses, for addressing the envelopes containing such material, and whereby considerable time may be saved in the operation of preparing such material for mailing, resulting in a corresponding decrease in the cost of doing the job.

Another object of the present invention is to provide a small, compact envelope addressing machine having means for quickly shifting each address into position in the machine so that the envelopes may be quickly successively fed into position beneath the pressure bar to receive their respective addresses.

A further object is to provide an addressing machine comprising a suitable tape upon which all of the addresses are typed, preferably in alphabetical order, and said tape being so mounted in the machine that the operator may readily manipulate the tape to successively advance the addresses into position in the machine in one direction, while the envelopes are successively fed into position over the tape in a direction at right angles to the travel of the tape, and pressed into address-receiving contact with the tape.

A further object is to provide in a machine of the class described, a simplified and inexpensive means for positively transferring a regulated quantity of printing fluid onto a surface of the face of each enevelope, as the envelopes are successively fed through the moistening device, and whereby each envelope is moistened just enough to cause its wetted surface to receive a clearly defined imprint from the address on the master tape with which it comes in contact, and whereby the addresses imprinted on said envelopes will have the appearance of being typed directly thereonto.

A further object is to provide a machine of the class described comprising a few moving parts and all of the moving parts thereof being of simple and inexpensive construction, and so arranged as to facilitate manufacture and assembly thereof.

A further object is to provide a machine for addressing envelopes having means for readily and conveniently aligning the addresses with the travel path of the envelopes fed through the machine, whereby the addresses will be neatly and accurately placed on their respective envelopes.

A further object is to provide an envelope-addressing machine comprising an elongated tape having a plurality of addresses typed thereon in uniformly spaced relation lengthwise of the tape, and said tape being movable over a suitable platen having means for pressing each envelope into address-receiving contact with an address on the tape, as the envelopes are successively fed [over] *to* the tape to receive their respective addresses.

Other objects of the invention reside in the novel construction of the means provided for controlling the application of the printing fluid onto the surface of the fluid transfer roll; in the simplified construction of the ink transfer roll and its complemental pressure roll which coact to moisten a portion of the face of each envelope with printing fluid, so that when the moistened surface of each envelope is subsequently pressed into contact with an address on the tape, it will receive an imprint from said address; in the provision of a machine of the character disclosed having a mirror positioned to reflect to the operator the position of each address advanced to the platen, and whereby each address as it is reflected in the mirror will show the address as it will subsequently appear on the envelope, whereby the operator may readily check each address before the envelopes are pressed into contact therewith; and in the provision of such an apparatus having means for facilitating the correction of addresses on the master tape, and whereby new addresses may readily and conveniently be added, when necessary, or a new address substituted for an old one, without requiring replacement of the master tape.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 8 is a sectional plan view on the line 8—8 of Figure 4;

Figure 9 is a detail sectional view on the line 9—9 of Figure 3, showing the mounting of the rear tape-supporting spool;

Figure 10 is a plan view of the fluid tank, removed from the machine; and

Figure 11 is a perspective view of the fluid transfer roll and its support, removed from the tank.

Figure 1:
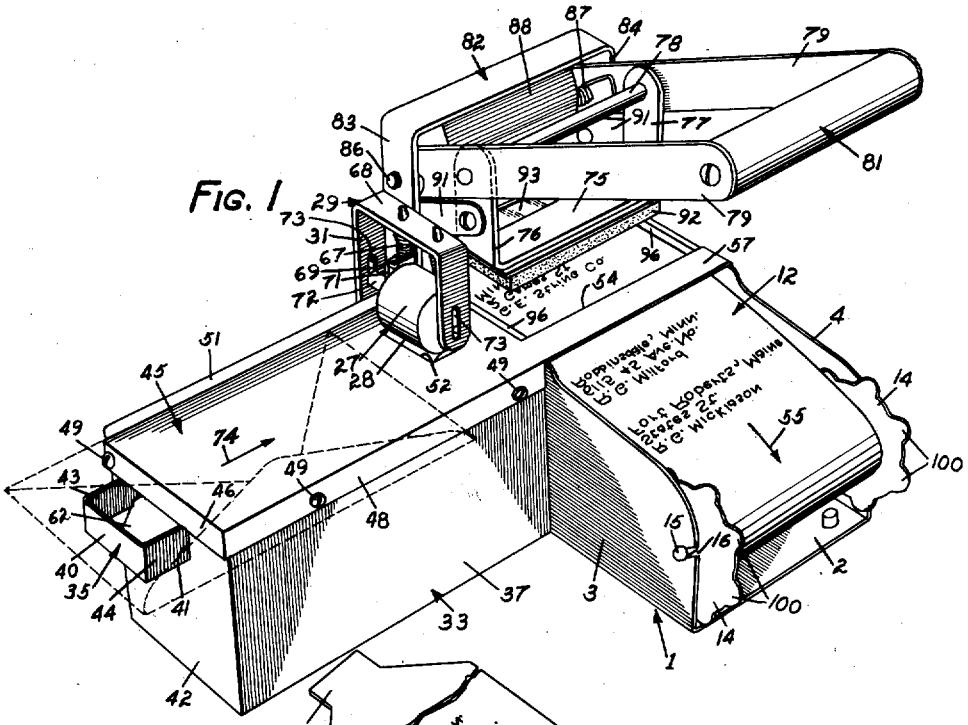
Figure 1 is a perspective view of my improved machine, showing an envelope in dotted lines about to be fed into position to receive an address.

The novel machine herein disclosed is shown comprising a frame 1, generally U-shaped in cross section, and comprising a bottom wall 2 and spaced side walls 3 and 4. A horizontally disposed *bed element or* platen 5 is shown secured to the upper member 6 of a U-shaped bracket, generally designated by the numeral 7, and having spaced legs 8 and 9 shown secured to the side walls 3 and 4 of the frame 1, by such means as screws or rivets 11. The platen 5 provides a support for a portion of a master tape 12 upon which the addresses are applied or typed in properly spaced relation.

Figure 6:
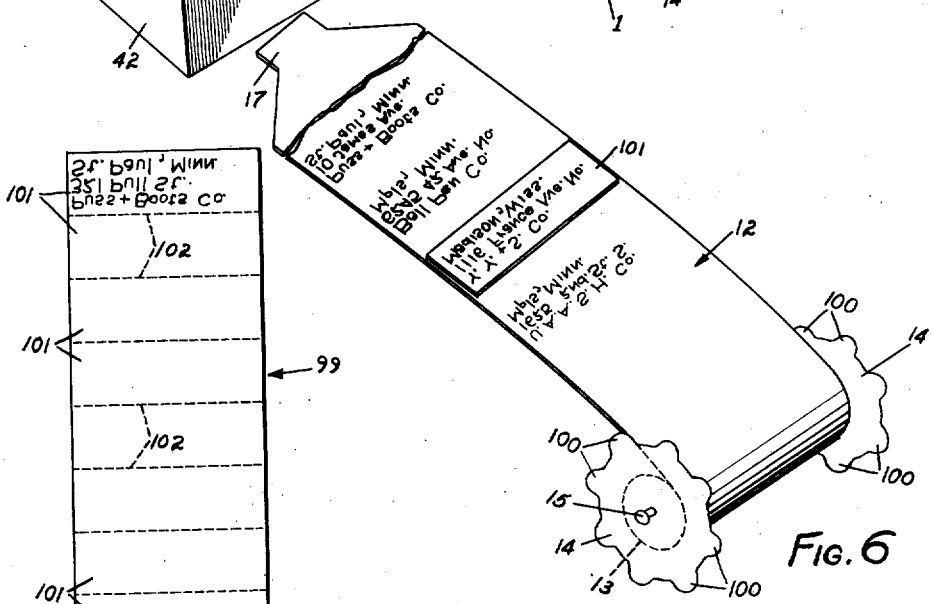
Figure 6 is a perspective view showing the master tape and its supporting roller removed from the machine, and also showing a correction label applied to the master tape.

The master tape is in the form of a strip of paper of suitable width and length whereby addresses of individuals and firms may be typed thereon transversely of the tape, and spaced apart lengthwise of the tape, as illustrated in Figure 6. The addresses are typed on the paper tape with a strip of suitable carbon paper, the carbon side of said carbon paper facing the back of the tape so as to make a carbon impression in reverse on the back of the tape, when the addresses are typed onto the master tape in a conventional typewriter. The carbon material used is such as to be readily transferable from the master tape onto the moistened faces of the envelopes, as each envelope is momentarily pressed into contact with an address on the master tape, as will be later described.

The tape with the addresses applied thereto is wound upon a spool 13 comprising end plates or disks 14 which may be secured to the ends of the spool by suitable nails or other fastening elements, now shown in the drawings. Pivot pins 15 are secured to the ends of the spool adapted to be detachably received in open ended slots or bearings 16 provided in the upright edges of the side walls 3 and 4, as clearly illustrated in Figures 1 and 2, and whereby the spool of tape may readily be inserted into the machine or be removed therefrom.

The opposite or free end of the tape is formed with a reduced tongue 17 adapted to be received in a slot 16 provided in a spool 19. The spool 19 is mounted in the rear portion of the frame 1 and is manually rotatable by manipulation of a crank 21 to wind the addressed portion of the tape thereon from the spool 13, it being understood that the inner end of the tape which is in direct contact with the spool 13 is not unwound from the spool, as may be understood by reference to Figure 6.

Disks 22 are secured to the ends of the spool 19 to guide the tape thereonto, and suitable trunnions or pivot pins 23 and 24 are also secured to the ends of the spool. The pivot pin 24 is shown extending outwardly beyond the side wall 3 and has a spring 20 interposed between its head 26 and the frame wall 3 to impose a slight friction on the spool 19 to prevent it from over-running, when the tape is longitudinally moved by manual manipulation of the spool 13, as will subsequently be described.

An important feature of the present invention resides in the means provided for moistening the front face of each envelope just prior to being delivered into position over the tape to receive an address. To thus moisten the envelopes, each envelope is passed between a spring-actuated pressure roll 27 and a fluid transfer roll 28, best shown in Figure 4. The pressure roll 27 is mounted in a bracket 29 which overhangs the path of travel of the envelopes and is shown having a depending leg 31 secured to the back wall 32 of a laterally extending frame portion 33, by such means as bolts 34.

The laterally extending frame portion 33 is preferably constructed of sheet metal formed to provide a box-like structure having one end secured to the side wall 3 of the main frame 1 by suitable means such as welding. The frame extension 33 is open at its top and bottom, and a fluid tank is mounted in the upper portion thereof and has its intermediate portion supported on a partition 36 having its ends secured to the back and front walls 32 and 37, respectively, of the frame extension 33.

Figure 4:
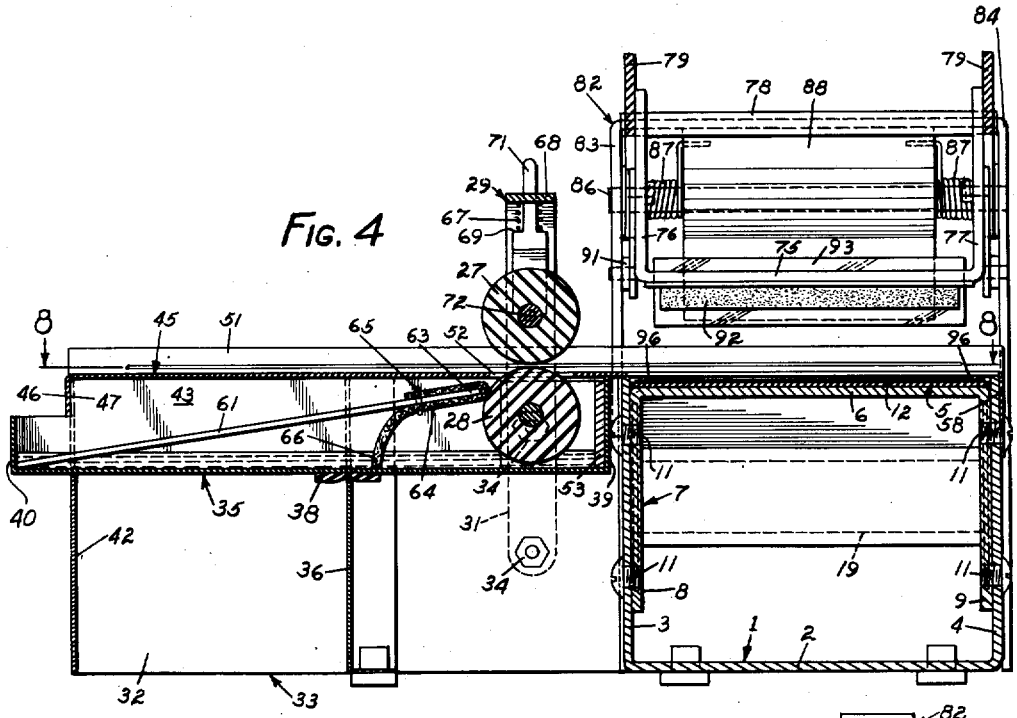
Figure 4 is a cross sectional view substantially on the line 4—4 of Figure 2, showing the means for regulating the amount of fluid transferred onto the envelope by the fluid transfer roll.

A suitable resilient element 38 may be interposed between the upper edge of the partition 36 and the bottom wall of the tank 35 to cushion the tank on the partition as will be understood. When the tank is in position in the machine, its right hand end 39, when viewed as shown in Figure 4, may abuttingly engage one of the screws 11, as shown in Figure 4, to limit movement of the tank in that direction. The opposite end 40 of the tank projects through a notch 41 provided in the end wall 42 of the frame extension 33, as illustrated in Figures 1 and 4. The overall length of the tank 35 is such that its end 40 projects beyond the end wall 42 of the machine frame, whereby fluid may conveniently be introduced into the tank through its projecting open end.

The side walls 43 and 44 of the tank 35 are notched, as shown in Figure 4, whereby the end 40 of the tank is reduced in height and projects outwardly from the notch in the end wall 42 of the machine frame, as hereinbefore stated.

The tank 35 is retained in position in the machine frame by a top plate 45 which provides a closure for the open top of the frame extension 33, and also the tank 35. The plate 45 has a depending flange 46 at one end which abuttingly engages the vertical edges 47 of the side walls of the tank to thereby retain the tank in position within the frame extension 33.

The top plate 45 also has a depending flange 48 seated against the outer surface of the front wall 31, as shown in Figure 1, and suitable screws 49 detachably secure the top plate 45 in place. The back portion of the top plate is formed with an upright guide flange 51 which serves to guide the envelopes in their movement towards the tape 12, whereby the operation of manually successively feeding the envelopes over the plate 45 and into position to receive an address is greatly facilitated. The intermediate portion of the top plate 45 is shown provided with an opening 52 through which the upper portion of the fluid transfer roll 28 projects, as best shown in Figure 4.

For convenience, the fluid transfer roll 28 may be rotatably supported in a U-shaped bracket 53 shaped to fit into one end of the tank 35, as shown in Figures 4 and 10. The fluid transfer roll is vertically aligned with the pressure roll 21, and projects through the opening 52 in the top plate 45, whereby it may engage each envelope passed over the plate 45 to thereby moisten a portion of the face of each envelope.

The top plate 45 also has a relatively larger opening 54 therein through which the portion of the master tape supported on the platen is exposed to the envelopes. In other words, the opening 54 is aligned with the path of travel of the tape, indicated by the arrow 55 in Figure 8. The side portions 56 and 57 of the plate 45 terminate at the right hand end of the machine in a depending flange 58, seated against the outer surface of the side wall 4 and preferably secured thereto by one of the screws or bolts 11. The guide flange 51 extends the full length of the plate 45 whereby the envelopes may be guided by said flange the length of their travel through the machine.

The platen or tape supporting plate 5 is disposed lengthwise of the opening 54 and is located in fixed relation to the guide flange 51 whereby the addresses applied to the envelopes will always be uniformly spaced from the bottom edges of the envelopes, provided, of course, that the addresses on the tape are brought into correct registry with the opening 54. The top surface of the platen is disposed slightly below the top surface of the plate 45, as shown in Figure 4, whereby the instant the operator releases the operating handle of the machine, the addressed envelope will move out of engagement with the master tape 12, thus preventing smearing of the ink on the face of the envelope.

Another important feature of the invention resides in the means provided for controlling the amount of moistening fluid transferred onto the face of each envelope by the periphery of the fluid transfer roll 28, each time an envelope is passed through the machine to receive an address. In other words, it is highly desirable that the face of each envelope be moistened just enough to cause its moistened surface to receive just enough ink from the master tape, when subsequently pressed into address-receiving contact therewith, to receive a sharply defined impression from the address on the master tape 12 without danger of the ink smearing.

To control the amount of fluid transferred onto the surface of each envelope, a bar 61, preferably of metal, is provided in the tank 35, and its length is such that when its pointed terminal 62 engages the end wall 40 of the tank, its opposite end 63 will be supported against the periphery of the fluid transfer roll 28, as shown in Figure 4. An absorbent wiping element 64 is fitted around the end 63 of the bar 61 and may be secured thereto by suitable means such as a staple 65. The absorbent element 64 has an end portion 66 depending into the fluid in the bottom of the tank. The element 64 wipes the excess fluid from the periphery of the roll 28 and allows just enough fluid to adhere thereto to adequately moisten each envelope. This is an extremely important feature of the invention, as it prevents over-moistening of the envelopes, which might result in a smudged impression on the face of an envelope.

By reference to Figure 4, it will be noted that only a small amount of fluid is normally contained in the tank 35, whereby only the lower peripheral portion of the fluid transfer roll 28 is submerged in the fluid. Should the fluid level drop to a level below the lowermost part of the roll 28, whereby the periphery of the roll would not contact the fluid, then the depending portion 66 of the fluid absorbent wiping element 64 may act as a wick to temporarily supply fluid to the periphery of the fluid transfer roll until the supply of printing fluid in the tank has been replenished. Under normal operating conditions the element 63 serves only as a wiping element to prevent an oversupply of fluid being transferred onto the envelopes by the fluid transfer roll 28.

The pressure roll 27 is removably supported in the bracket 29 which, it will be noted by reference to Figures 1 and 4, has its upper portion overhanging the table top or plate 45, whereby the pressure roll 21 is supported directly over the fluid transfer roll 28, as hereinbefore stated. The pressure roll 27 is normally held in yieldable contact with the periphery of the roll 28 by suitable springs 67, interposed between the upper horizontal portion 68 of the bracket 29, and shoulders 69 provided on upright pressure bars 71, having their lower ends forked and engaged with the shaft 72 of the pressure roll 27. The terminals of the shaft 72 are reduced in diameter and are rotatably received in slots 13 provided in the bracket 29, whereby the shaft 72 is adapted for limited vertical movement in the bracket 29.

Figure 2:
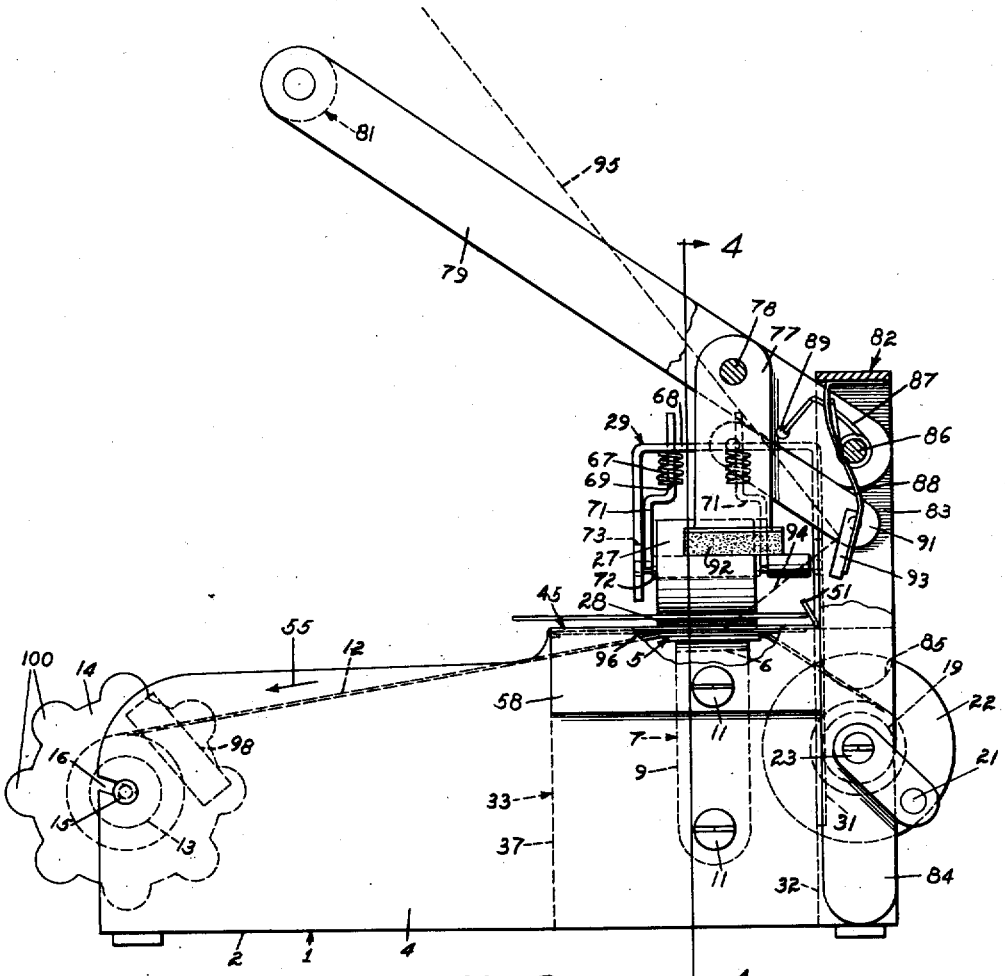
Figure 2 is a view looking at the machine from one side thereof, the operating lever being shown in its normal elevated position, the short broken line indicating the reflection of the address into the mirror, and the relatively longer broken line indicating the operator's line of vision.

The pressure bars 71 are disposed in opposed relation, as best illustrated in Figure 2, and cooperate to constantly exert a downward pressure upon the roll 27 because of the springs 67. Thus, as each envelope is fed between the rolls 27 and 28, the portion of the face of each envelope engaging the moistened surface of the fluid transfer roll 28 will be held firmly in contact with the periphery of said roll to assure uniform moistening of the face of each envelope, which is essential in order to produce work of uniform quality.

Another important feature of this invention resides in the manner in which the envelopes are successively fed into position over the tape to receive an address. By referring to Figures 1 and 4, it will be noted by reference to the arrow 14, that the envelopes are fed over the tape in a direction at substantially right angles to the direction of the travel of the tape. This has been found extremely desirable in the operation of the machine, as it makes it possible for an operator to conveniently shift the master tape from one address to the next with one hand, and with his other hand feed an envelope between the rolls 27 and 28, into position over the platen 5 to receive an address.

The means for pressing the envelopes into address-receiving engagement with the tape is best shown in Figure 1, and comprises a pressure bar 75, shown having upturned end portions 76 and 77 pivotally supported on a shaft 78 mounted in the spaced members 79 of a suitable operating handle, generally designated by the numeral 81. The spaced members 79 of the operating handle are pivotally mounted on a cross shaft 86, supported in the spaced legs 83 and 84 of an inverted U-shaped bracket, generally designated by the numeral 82. The spaced legs 83 and 84 of the bracket 82 are shown seated against the outer surface of the side walls 3 and 4 of the machine frame, as will be noted by reference to Figure 8. The leg 84 preferably extends to the bottom of the machine frame, whereas the leg 83 may terminate at a higher elevation, as indicated by the dotted line 85 in Figure 2.

Figure 3:
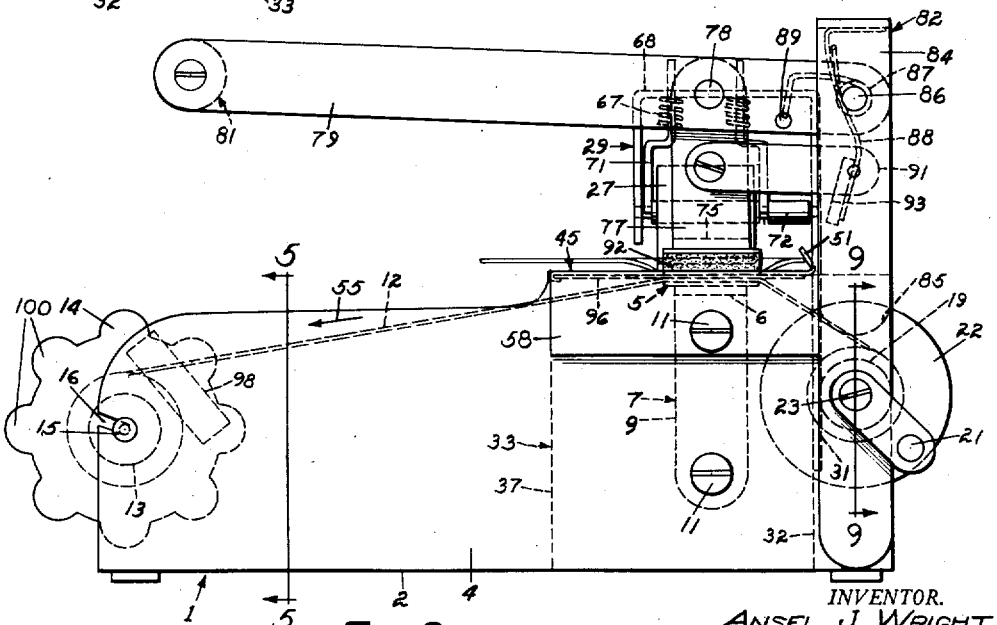
Figure 3 is a similar view showing the operating lever in its depressed position.

Suitable torsion springs 87 are coiled about the shaft 86 adjacent the ends thereof and each has one end anchored to a plate 88. The opposite ends of the springs 87 are received in aperatures 89 provided in the side members 79 of the operating handle 81, as shown in Figures 2 and 3, whereby said springs cooperate to support the handle in its normal elevated position, shown in Figure 2.

To cause the pressure bar 75 to follow substantially a straight path in its up and down travel, a link 91 is shown having one end pivoted to the leg 83 of the U-shaped bracket 82, and its opposite end to the upright leg 76 of the pressure bar 75. The link 91 is disposed in parallel relation to the adjacent side member 79 of the operating handle, whereby the pressure bar is always retained in operative relation to the platen 5 and the envelope fed over the tape to receive an address. A suitable cushion pad 92 is preferably secured to the bottom face of the pressure bar 75 adapted to directly engage the envelope and exert a squeezing pressure thereon, when the operating handle is manipulated to press an envelope into address-receiving contact with the tape.

Another important feature of the invention resides in the provision of means whereby the operator may carefully check each address as it is brought into place beneath the pressure plate 75 to assure him that the name of each addressee and his address are correctly spelled, and also that the addresses will be properly positioned upon the envelopes.

The means provided whereby the operator may thus conveniently view each address, as it is advanced into position over the platen 5, is best shown in Figure 2, and comprises a mirror 93 secured to the lower marginal edge portion of the plate 88 and disposed at the proper angle with respect to the operator's eyes, whereby each address as it is moved into position beneath the pressure bar 75, will be reflected in the mirror 93 so that the operator may conveniently view each address as it moves into position over the platen. In Figure 2, the broken line 94 indicates the reflection of the address into the mirror, and the broken line 95, the operator's line of vision.

A pair of spring clips or fingers 96 have their end portions 90 secured to the bottom side of the portion 57 of the top plate 45, and extend across the opening 54 at each end thereof with their opposite ends disposed beneath the plate portion 56, as clearly illustrated in Figure 8.

The spring fingers 96 are disposed over the marginal edge portions of the master tape 12, and function to hold said edge portions in contact with the platen 5, as will be understood. The shaded area 97 on each spring finger 96 may be colored red, or some other bright color, to facilitate aligning each address with the platen. In other words, each address moved into position over the platen 5 must be substantially aligned with the colored areas 97 to assure correct and uniform placement of the addresses upon the faces of the envelopes.

Figure 5:
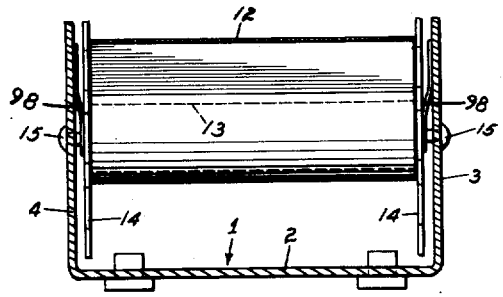
Figure 5 is a detail sectional view substantially on the line 5—5 of Figure 3.

To prevent the tape spool 13 from overrunning when the crank 21 of the spool 19 is manipulated to wind the tape onto the spool 19, to prepare the machine for operation, suitable springs 98 are shown secured to the inner surfaces of the side walls 3 and 4 of the machine frame and have their free ends frictionally engaging the disks 14 to thereby prevent the spool from overrunning, as will be understood by reference to Figures 5 and 8.

Means is also provided to facilitate making corrections on the master tape, in the event that it becomes necessary to change an address, or in the event that the name and address of a firm or individual is to be removed from the mailing list.

Figure 7:
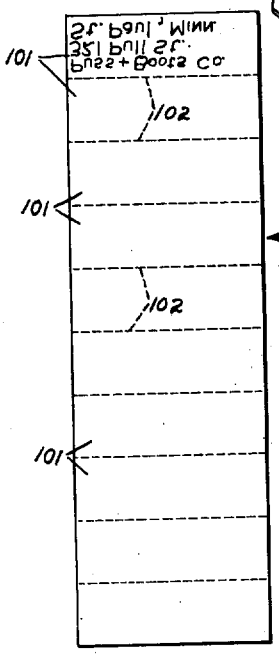
Figure 7 is a plan view of a strip of tape of correction labels, an address being typed or printed on one of the labels.

To make such corrections on the tape, a strip of correction labels, shown at 99 in Figure 7, is divided into a plurality of labels 101 by lines of perforations 102, whereby the labels may readily be successively torn from the strip 99, as required. When a new address is to be substituted for one already on the master tape 12, the new address is typed onto the end label of the strip 99, as shown in Figure 7, and the typed label is then torn from the strip 99 and placed over the address on the master tape which is to be deleted or removed therefrom. The labels are gummed on one side so that they may readily and quickly be secured to the master tape.

In the operation of the novel envelope addressing machine herein disclosed, the envelopes to be addressed may be placed in a stack on a table adjacent to the addressing machine, and the master tape is then positioned in the machine and its free end inserted in the slot 18 provided in the rear spool 19. The spool 19 is then rotated by manipulation of the crank 21 to wind the master tape onto said spool, until the last address on the opposite end of the tape is positioned over the platen 5.

The addresses may be placed in any desired order upon the master tape, depending upon the order in which the envelopes are to be addressed. It has been found very practical, however, to arrange the list of addresses alphabetically on the tape with blank spaces being left between the letters of the alphabet for the insertion of additional names, when necessary. When applying or typing the addresses onto the tape, the "A" names are typed onto or adjacent to the end of the tape which is wound directly onto the spool 13. Then when the typed tape is wound onto the rear spool 19, as hereinbefore stated, the "A" addresses are first brought into position upon the platen 5 in the order in which they are typed on the tape, and thereafter the "B" addresses, etc.

When the first "A" address has been brought into position over the platen, the operator grasps an envelope with his left hand and places it on the plate 45 against the guide 51, and then moves it along the plate between the moistening rolls 27 and 28 and into position over the address positioned on the platen. The operator then with his right hand manipulates the lever 81 to move the pad 92 of the pressure bar 75 into engagement with the envelope whereby the moistened surface of the envelope is pressed into address-receiving contact with the master tape to receive an address. As the operator releases his grasp on the lever 81, he engages one of the projections 100 of one of the disks 14 of the spool 13, and rotates said spool in the direction indicated by the arrow in Figure 1, whereby the tape is advanced in the direction of the [arrows] *arrow* 55 to position the next following address over the platen 5. It will thus be seen that an operator may quickly and conveniently feed the envelopes through the machine with one hand, and with his other hand manipulate the operating lever 81 and the master tape 12, as above described.

By reference to Figures 1 and 8, it will be noted, as hereinbefore stated, that the envelopes are fed into position beneath the pressure bar 75 in a direction at right angles to the directional movement of the master tape.

The spring pressure applied to the pressure roll 27 is comparatively light but is sufficient to hold each envelope in peripheral contact with the fluid transfer roll 28 to assure that the face of each envelope will be moistened sufficiently to receive a clearly defined impression, when pressed into address-receiving contact with the tape 12. By feeding the envelopes into the machine as above described, the operation of the machine may be greatly expedited, as the operator may readily shift the tape from one address to the next with one hand while he moves an envelope into position over the platen 5 with his other hand.

The machine is very simple and inexpensive in construction, and the parts are so arranged as to facilitate assembling the parts, and also whereby the machine may readily be disassembled, if necessary, to facilitate making repairs or for cleaning. The parts are also so constructed and arranged that the machine readily lends itself for manufacture in quantity production at low cost.

In the specification and accompanying drawings, a manually operable machine has been disclosed, wherein the tape is manually manipulated to intermittently advance the addresses into position over the platen 5. It is to be understood, however, that if desired, means not shown may be provided for automatically advancing the master tape from one address to the next, each time the operating lever 81 is depressed to press an envelope into address-receiving position with the tape.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. A bed and platen hectographic addressing machine comprising, in combination, a frame including an envelope supporting member at one end thereof and a bed element in alignment therewith at the opposite end of said frame, a platen operating frame pivotally connected to said first named frame at a point adjacent the rear edge thereof, said platen operating frame extending transversely of said first named frame from the rear edge thereof in a position above said bed element and forwardly thereof, a pressure platen mounted on said platen operating frame in a position above said bed element and in alignment with the envelope supporting member, a pair of [feed] *supply* and take-up [rollers] *spools* rotatably mounted at opposite sides of said pressure platen, a hectographic master tape carried by said [rollers] *spools* and being movable forwardly and rearwardly between said bed and platen by [manual operation of the take-up roller] *manipulation of said spools*, said tape having a list of addresses typed thereon in spaced relation lengthwise of the tape, said first named frame being provided with an opening between said envelope supporting member and said bed element, a pressure roll mounted below said envelope supporting member and extending upwardly through said opening, a second pressure roll mounted above said first named roll and adapted to exert pressure thereon, and [a hectographic moistening fluid supply means for depositing said fluid on one of said pressure rolls whereby a downward manual movement of the operating frame will move the platen to press an address section of the tape into printing engagement with the moistened surface of an envelope after it has been fed laterally across the surface of the moistening roll into a printing position with respect to said tape.] *means for supporting a supply of hectographic moistening fluid with the fluid in contact with one of said rolls, whereby when an envelope is passed between said rolls in its movement from the envelope supporting frame to a printing position adjacent to said tape, a surface of the envelope is moistened to condition the envelope to receive an impression, when said operating frame is subsequently actuated to cause the platen to press the moistened surface of the envelope and an address section of the tape into printing engagement, one with the other.*

2. A bed and platen hectographic addressing machine comprising a main body frame, said frame being provided with an envelope supporting member with an end thereof adjacent one end edge of said frame, a platen operating frame pivotally connected to said body frame at a point adjacent the rear edge thereof [and adjacent the other end edge of the body frame], the forward free end of the operating frame serving as a hand grip portion, said operating frame being provided with a pair of downwardly extending bracket arms, a pressure platen carried by said arms in alignment with the envelope supporting member, a bed element supported on said body frame in a position below said pressure platen, a pair of [feed] *supply* and take-up [rollers] *spools* rotatably mounted at opposite sides of said pressure platen, a hectographic master tape carried by said [rollers] *spools* and being movable forwardly and rearwardly between said bed and platen by [manual operation of the take-up roller] *manipulation of said spools*, said tape having a list of addresses typed thereon in spaced relation lengthwise of the tape, said envelope supporting member having an opening formed in [the] *its* envelope supporting surface adjacent the bed element, a pressure roll mounted below said envelope supporting member and extending upwardly through said opening, a second pressure roll mounted above said first named roll and adapted to exert pressure thereon, and [a hectographic moistening fluid supply means for depositing said fluid on one of said pressure rolls whereby a downward manual movement of the operating frame will move the platen to press an address section of the tape into printing engagement with the moistened surface of an envelope after it has been fed laterally across the surface of the moistening roll into a printing position with respect to said tape.] *means for supporting a supply of hectographic moistening fluid with said fluid in contact with one of said rolls, whereby when an envelope is passed be-*

*tween said rolls in its movement from the envelope supporting frame to a printing position adjacent to said tape, a surface of the envelope is moistened to condition the envelope to receive an impression, when said operating frame is subsequently actuated to cause the platen to press the moistened surface of the envelope and an address section of the tape into printing engagement, one with the other.*

3. A bed and platen hectographic addressing machine comprising, in combination, a frame including an envelope supporting member at one end thereof and a bed element in alignment therewith at the opposite end of said frame, a platen operating frame pivotally connected to said first named frame at a point adjacent the rear edge thereof, said platen operating frame extending transversely of said first named frame from the rear edge thereof in a position above said bed element and forwardly thereof, the forward free end of said platen operating frame serving as a hand grip portion, a pressure platen mounted on said platen operating frame in a position above said bed element and in alignment with the envelope supporting member, a pair of [feed] *supply* and take-up [rollers] *spools* rotatably mounted on said first named frame at opposite sides of said pressure platen, a hectographic master tape carried by said [rollers] *spools* and being movable forwardly and rearwardly between said bed and platen by [manual operation of the take-up roller] *manipulation of said spools,* said tape having a list of addresses typed thereon in spaced relation lengthwise of the tape, said first named frame being provided with an opening between said envelope supporting member and said bed element; a pressure roll mounted below said envelope supporting member and extending upwardly through said opening, a second pressure roll mounted above said first named roll and adapted to exert pressure thereon, and [a hectographic moistening fluid supply means for depositing said fluid on said first named pressure roll whereby a downward manual movement of the operating frame will move the platen to press an address section of the tape into printing engagement with the moistened surface of an envelope after it has been fed laterally across the surface of the moistening roll into a printing position with respect to said tape.] *means for supporting a supply of hectographic moistening fluid with said fluid in contact with said first named pressure roll whereby each time an envelope is passed between said rolls in its movement from the envelope supporting frame to a printing position relative to said tape a surface of the envelope is moistened so that when said operating frame is manipulated to cause the platen to press the moistened surface of the envelope and an address section of the tape into printing engagement, one with the other, said envelope will receive an impression.*

4. A bed and platen hectographic addressing machine comprising, in combination, a frame including an envelope supporting member at one end thereof and a bed element in alignment therewith at the opposite end of said frame, a platen operating frame pivotally connected to said first named frame at a point adjacent the rear edge thereof, said platen operating frame extending transversely of said first named frame from the rear edge thereof in a position above said bed element and forwardly thereof, the forward free end of said platen operating frame serving as a hand grip portion, a pressure platen mounted on said platen operating frame in a position above said bed element and in alignment with the envelope supporting member, a pair of [feed] *supply* and take-up [rollers] *spools* rotatably mounted on said first named frame at opposite sides of said pressure platen, a hectographic master tape carried by said [rollers] *spools* and being movable forwardly and rearwardly between said bed and platen by [manual operation of the take-up roller] *manipulation of said spools,* said tape having a list of addresses typed thereon in spaced relation lengthwise of the tape, said first named frame being provided with an opening between said envelope supporting member and said bed element, an envelope moistening [pressure] roll mounted below said envelope supporting member and extending upwardly through said opening, a [second] pressure roll mounted above said envelope moistening [pressure] roll and adapted to exert pressure thereon, and a hectographic moistening fluid supply tank mounted below said envelope supporting member, said envelope moistening [pressure] roll being positioned within said *fluid* supply tank and adapted to engage the hectographic moistening fluid [in said tank] *therein,* whereby a downward [manual] movement of the operating frame will move the platen to press *the moistened surface of the envelope and* an address section of the tape into printing engagement [with the moistened surface of an envelope], *one with the other,* after [it] *the envelope* has been fed laterally across the surface of the moistening roll into printing position with respect to said tape.

ANSEL J. WRIGHT.

REFERENCES CITED

The following references are of record in the file of this patent or in the original patent:

UNITED STATES PATENTS

| Number | Name | Date |
|---|---|---|
| 878,117 | Burke | Feb. 4, 1908 |
| 1,319,568 | Dahl | Oct. 21, 1919 |
| 1,808,812 | Glass | June 9, 1931 |
| 2,014,727 | Flood | Sept. 17, 1935 |
| 2,051,376 | Hernlund | Aug. 18, 1936 |
| 2,132,282 | Ajouelo | Oct. 4, 1938 |
| 2,184,362 | Sauerman | Dec. 26, 1939 |
| 2,185,682 | Pittman | Jan. 2, 1940 |
| 2,262,250 | Ralston | Nov. 11, 1941 |
| 2,269,086 | Morris | Jan. 6, 1942 |
| 2,278,197 | Gilbert | Mar. 31, 1942 |
| 2,280,095 | Metzner | Apr. 21, 1942 |
| 2,303,171 | Morrison | Nov. 24, 1942 |
| 2,342,560 | Slonczewski | Feb. 22, 1944 |

FOREIGN PATENTS

| Number | Country | Date |
|---|---|---|
| 267,696 | Great Britain | Mar. 24, 1927 |